United States Patent
Gomes, II

(10) Patent No.: US 9,476,517 B2
(45) Date of Patent: Oct. 25, 2016

(54) PILOT VALVE STRUCTURES AND MASS FLOW CONTROLLERS

(71) Applicant: Richard Gomes, II, Litchfield, NH (US)

(72) Inventor: Richard Gomes, II, Litchfield, NH (US)

(73) Assignee: MKS Instruments, Inc., Andover, MA (US)

( * ) Notice: Subject to any disclaimer, the term of this patent is extended or adjusted under 35 U.S.C. 154(b) by 125 days.

(21) Appl. No.: 14/194,092

(22) Filed: Feb. 28, 2014

(65) Prior Publication Data
US 2015/0247586 A1 Sep. 3, 2015

(51) Int. Cl.
| F16K 31/40 | (2006.01) |
| F16K 31/385 | (2006.01) |
| F16K 31/128 | (2006.01) |

(52) U.S. Cl.
CPC ........... *F16K 31/404* (2013.01); *F16K 31/128* (2013.01); *F16K 31/385* (2013.01); *Y10T 137/7759* (2015.04); *Y10T 137/7768* (2015.04)

(58) Field of Classification Search
CPC ............... F16K 31/128; F16K 31/404; Y10T 137/7768; Y10T 137/7759
USPC ......................... 137/487.5; 251/129.15, 30.01
See application file for complete search history.

(56) References Cited

U.S. PATENT DOCUMENTS

| 3,949,964 A | 4/1976 | Freeman |
| 3,994,318 A | 11/1976 | Ishigaki |
| 4,796,854 A | 1/1989 | Ewing |
| 5,687,759 A | 11/1997 | Tan |
| 8,172,197 B2 | 5/2012 | Gu et al. |
| 2012/0153193 A1 | 6/2012 | Gu et al. |
| 2012/0279584 A1 | 11/2012 | Broker et al. |
| 2014/0150559 A1 | 6/2014 | Ishihara et al. |
| 2015/0040674 A1 | 2/2015 | Ishihara et al. |

FOREIGN PATENT DOCUMENTS

| EP | 0041247 | 11/1985 |
| EP | 0769645 | 4/1997 |

OTHER PUBLICATIONS

International Search Report and the Written Opinion from corresponding PCT Application No. PCT/US2015/015350 dated May 19, 2015.
Chen et al., "Microfabricated Implantable Parylene-Based Wireless Passive Intraocular Pressure Sensors", Journal of Microelectromechanical Systems, 17:1342-1351 (2008).
Gu et al., "Low Frequency MEMS Piezoelectric Energy Harvesting," PowerMEMS, Seoul, South Korea, pp. 15-18 (2011).
Sari et al., "An Electromagnetic Micro Energy Harvester Based on an Array of Parylene Cantilevers," J. Micromech. Microeng., 19:1-13 (2009).

*Primary Examiner* — Kevin Lee
*Assistant Examiner* — P. Macade Nichols
(74) *Attorney, Agent, or Firm* — McDermott Will and Emery

(57) ABSTRACT

Pilot valve structures are described as including a main valve having a main flow body and having an inlet and outlet, and a diaphragm, with a perimeter, a moveable portion, and first and second sides. A main flow orifice is located in the flow body between the inlet and outlet. A main valve plug is attached to and/or disposed in the moveable portion of the diaphragm and opens and closes the flow orifice when the moveable portion of the diaphragm is in first and second positions. The pilot valve also includes a pilot valve inlet that is connected to the flow path of the main flow body. A pilot valve outlet/orifice is disposed within and co-located with the main valve plug. The pilot valve includes a pilot valve plug, which is moveable to open and close the pilot valve orifice. Related mass flow controllers with such pilot valve structures are further described.

14 Claims, 3 Drawing Sheets

PILOT VALVE STRUCTURES AND MASS FLOW CONTROLLERS

BACKGROUND

Valves exist in a wide variety of forms and sizes, serving a multitude of purposes, handling the flow of materials whose characteristics range from light gases to heavy slurries and near-solids. Valves can be configured as shut-off valves so as to be operable in either of two states, i.e., completely opened and completely closed. Alternatively, the valves can be proportional control valves so that the valve can be moved though positions between fully closed and fully opened positions so that the flow through the valve can be controlled depending on how much the valve is opened. Valves can be a normally-opened valve in which case the valve is fully opened in the absence of the application of a control signal, or a normally-closed valve in which case the valve is fully closed in the absence of the application of a control signal. Proportional control valves which are capable of responding quickly to control flows with precision and with little electrical power, are of special interest in certain industrial processing, such as flow control of gases and vapors in semiconductor and integrated-circuit manufacture. Mass flow controllers, for example, are widely used in controlling the delivery of process gases in semiconductor manufacturing. Such controllers require accurate control valves so as to deliver very precise amounts of gases during process runs.

Many commercially available mass flow controllers tend to use solenoid valves because solenoid valves are accurate and reliable. Solenoid valves usually each include a valve plunger in the form of plug that moves into and out of contact with a valve seat in response to the application of current to a solenoid coil, which in turn creates flux through a magnetic circuit so as to create an electromagnetic force (emf) on an armature that moves the plug. Because the emf force can be applied to the armature in only one direction, the solenoid valve includes a spring to move the plug in the other direction when the emf force is reduced or removed. Solenoid valves have dominated the designs of mass flow controllers because of their simplicity, low cost and fast response.

Solenoid valves have been designed with a pressure balancing feature, which is particularly useful in neutralizing the forces due to pressure of the gas within the valve when applying the necessary control forces to overcome frictional forces in order to accurately control flow through broad-area flow passages, particularly when opening the valve from a normally closed state. For an example of a pressure-balanced, solenoid proportional control valve designed to reduce these adverse influences on valve performance see U.S. Pat. No. 4,796,854 (Ewing) assigned to MKS Instruments, Inc. of Andover, Mass., U.S.A.

So-called pilot valves have two valve structures coupled together, with one typically being a smaller valve that is used to control the second, larger valve. Pilot valves typically have been used in high-pressure and/or high flow rate (Q) applications. FIG. 1 illustrates a prior art pilot valve 100 in two operational conditions, shown in A and B.

Pilot valve 100 includes a pilot orifice 102 that is opened and closed by way of a solenoid 104 moving a plunger 106, which may be controlled by an external command/signal, e.g., a user using a computer or other device. In operation, the plunger 106 acts on the pilot orifice 102 to close or open it, depending upon whether the solenoid 104 is energized or de-energized, thus permitting pressurization or release of pressure in the associated pilot chamber 110. The pilot valve operates to control a "piloted" valve, which is equipped with a diaphragm 112 holding or connected to a plug 113, which, as it moves with the diaphragm 112, opens and closes a main orifice 114. A bleed orifice 116, in conjunction with the pilot valve plunger 106, controls pressure causing movement of diaphragm 112 so as to open and close the main orifice 114, which when opened allows flow, e.g., of a pressurized medium (such as a reactant gas or other fluid), along a main flow channel (shown by flow paths along conduit 118). In operation, when the solenoid 104 is energized, it moves the plunger 106 and opens the pilot orifice 102, thereby releasing pressure from the pilot chamber 110. This results in higher pressure on the bottom of the diaphragm 112 which is lifted by the line pressure, opening the main orifice 114. When the solenoid 104 is de-energized, the pilot orifice 102 is closed and full line pressure is applied in the pilot chamber 110 through the bleed orifice 116, thereby providing a seating force for tight closure. In this way, the smaller solenoid, plunger, and pilot orifice operate to effectively control the larger main valve structure.

While existing designs may be able to provide desired operational performance, they can nevertheless prove to be overly complex and expensive for some applications. For example, while such designs can provide excellent proportional-control solenoid-type valves able to swiftly and accurately govern even relatively large volumes and high rates of fluid flow using relatively low levels of electrical power (since the valves are aided by the force counterbalancing achieved through the use of the bellows-type coupling), and/or sensitive and precise valve operation by way of the frictionless suspension of broad-area valve members and the counterbalancing of undesirable pressure-generated forces through a correlated pressure-responsive coupling, the bellows and springs used for such valves can increase cost and complexity in a prohibitive manner for some applications.

SUMMARY

A simplified pilot valve structure or assembly according to the subject technology may include a main valve plug that has a pilot valve orifice integrally formed within the plug. Such a structure can provide for fewer moving parts, overall part count, part complexity, and/or reduced cost for manufacture of a pilot valve.

Examples of such a pilot valve structure, or assembly, can include a main valve having a main flow body defining a flow path for a fluid and having an inlet and outlet, a diaphragm, with a perimeter, a moveable portion, and first (upstream) and second (downstream) sides. The perimeter of the diaphragm is fixed with respect to the valve body, and the moveable portion is operative to move in response to a pressure differential existing between the first and second sides. A main flow orifice is located in the flow body between the inlet and outlet. A main valve plug is attached to and/or disposed in the moveable portion of the diaphragm and is operative to open and close the flow orifice when the moveable portion of the diaphragm is in first and second positions ("open" and "closed"), respectively. The pilot valve can have a pilot valve flow body defining a flow path. Pilot valve also includes a pilot valve inlet that is fluidically connected to the flow path of the main flow body, e.g., upstream of the main flow orifice. Pilot valve further includes a pilot valve outlet including an orifice disposed within (e.g., integral with) and co-located with the main valve plug. The pilot valve orifice has a suitable cross-sectional area and is configured to permit fluid flow from the pilot inlet to the main flow orifice. The pilot valve includes a pilot valve plug, which is moveable along a range of positions (e.g., from a first to a second position) to open and close the pilot valve orifice. A pilot valve solenoid (e.g., with an armature and coil) can be connected to the pilot valve plug to control the position of the pilot valve plug along the range of positions in response to a received command signal, e.g., from a user input device and/or processor.

Such pilot valve structures may be included within or be a part of other devices, e.g., mass flow verifiers or mass flow controllers.

In one example, a pilot valve assembly can include a main valve having a main flow body defining a flow path for a fluid and having an inlet and outlet, a diaphragm—with the diaphragm having a perimeter, a moveable portion, and first and second sides. The perimeter of the diaphragm can be fixed with respect to the valve body, and the moveable portion can be operative to move in response to a pressure differential existing between the first and second sides. A main flow orifice can be located or disposed in the flow body between the inlet and outlet. A main valve plug can be attached to the moveable portion of the diaphragm and operative to open and close the flow orifice when the moveable portion of the diaphragm is in first and second positions, respectively.

The pilot valve assembly can also include a pilot valve having (i) a pilot valve flow body defining a flow path and having a pilot valve inlet connected to the flow path of the main flow body upstream of the main flow orifice, (ii) a pilot valve outlet including an orifice disposed within the main valve plug, wherein the pilot valve orifice has a cross-sectional area and is configured to permit fluid flow from the pilot inlet to the main flow orifice, (iii) a pilot valve plug moveable along a range of positions from a first position to a second position and operative to open and close the pilot valve flow orifice when the pilot valve plug is in first and second positions, respectively, and (iv) a pilot valve solenoid connected to the pilot valve plug and operative to control the position of the pilot valve plug along the range of positions in response to a received command signal. The pilot valve orifice can be co-located with and integral to the main valve plug, e.g., formed as an aperture within the main valve plug.

The pilot valve assembly may have the following features (which may be present individually or in any combination): the pilot valve inlet can have a cross-sectional area less than the cross-sectional area of the pilot valve orifice. The pilot valve outlet can include an outlet channel having an end proximal to the pilot valve plug and an end distal to the pilot valve plug, and the proximal end of the outlet channel can have a cross-sectional area that is less than or equal to the cross-sectional area of the distal end of the outlet channel. The outlet channel can have a conical profile. The ratio between the cross-sectional area of the pilot valve inlet to the cross-sectional area of the pilot valve orifice can be selected such that the pilot valve creates differential pressure between the first and second sides of the diaphragm; the ratio can, e.g., be in the range of 0.2 to 0.7, though other ratios are of course feasible. The range of operational pressures on the inlet side of the pilot valve assembly can be, e.g., between 22 psia and 55 psia, though other pressure values are of course feasible.

In one example, a mass flow controller with pilot valve can include the following:

(A) a flow sensor having a bypass, and a sensor tube with thermal flow sensors;

(B) a control valve having a main valve having (i) a main flow body defining a flow path for a fluid and having an inlet and outlet, (ii) a diaphragm, with a perimeter, a moveable portion, and first and second sides, wherein the perimeter of the diaphragm is fixed with respect to the valve body, and wherein the moveable portion is operative to move in response to a pressure differential existing between the first and second sides, (iii) a main flow orifice in the flow body between the inlet and outlet, and (iv) a main valve plug attached to the moveable portion of the diaphragm and operative to open and close the flow orifice when the moveable portion of the diaphragm is in first and second positions, respectively;

(C) a pilot valve having (i) a pilot valve flow body defining a flow path and having a pilot valve inlet connected to the flow path of the main flow body upstream of the main flow orifice, (ii) a pilot valve outlet including an orifice disposed within the main valve plug, with the pilot valve orifice having a cross-sectional area and being configured to permit fluid flow from the pilot inlet to the main flow orifice, (iii) a pilot valve plug moveable along a range of positions from a first position to a second position and operative to open and close the pilot valve flow orifice when the pilot valve plug is in first and second positions, respectively, and (iv) a pilot valve solenoid, which can be connected to the pilot valve plug and operative to control the position of the pilot valve plug along the range of positions in response to a received command signal; the pilot valve orifice can be, and preferably is, co-located with and integral to the main valve plug; and (D) a controller operative to receive a setpoint command signal, receive signals indicative of mass flow from the mass flow sensors, and control a mass flow output of the mass flow controller by controlling the pilot valve solenoid to move the pilot valve plug.

The mass flow controller may have the following features (which may be present individually or in any combination): the pilot valve inlet can have a cross-sectional area less than the cross-sectional area of the pilot valve orifice. The pilot valve outlet can include an outlet channel having an end proximal to the pilot valve plug and an end distal to the pilot valve plug, with the proximal end of the outlet channel having a cross-sectional area that is less than or equal to the cross-sectional area of the distal end of the outlet channel. The outlet channel can have a conical profile. The ratio between the cross-sectional area of the pilot valve inlet to the cross-sectional area of the pilot valve orifice may be selected such that that the pilot valve creates differential pressure between the first and second sides of the diaphragm. The ratio may be in a desired range of values, e.g., in the range of 0.2 to 0.7. The range of operational pressures on the inlet side may be, e.g., between 22 psia and 55 psia.

These, as well as other components, steps, features, benefits, and advantages of the present disclosure, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1A:
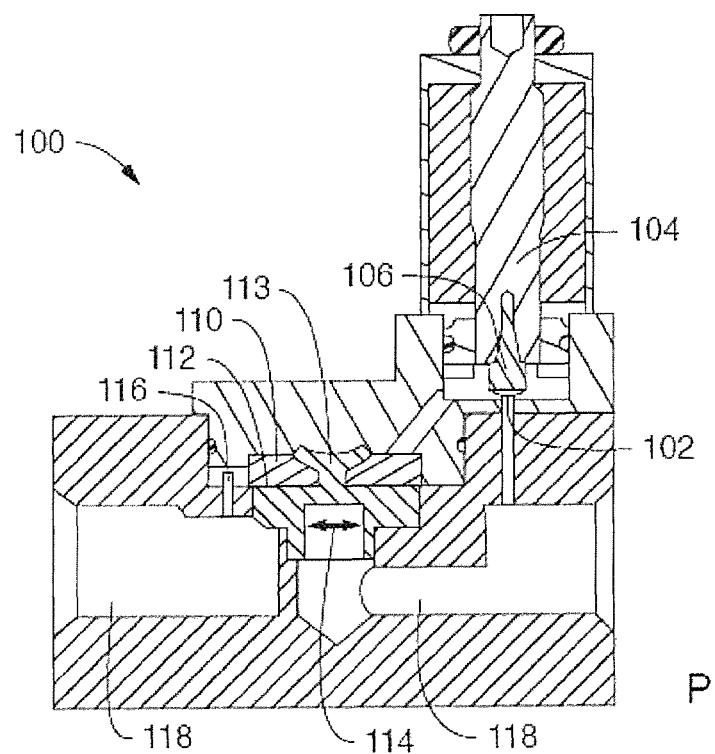
FIG. 1 depicts a cross-section view of an example of a prior art pilot valve structure, in two operational conditions (views A-B).
Figure 1B:
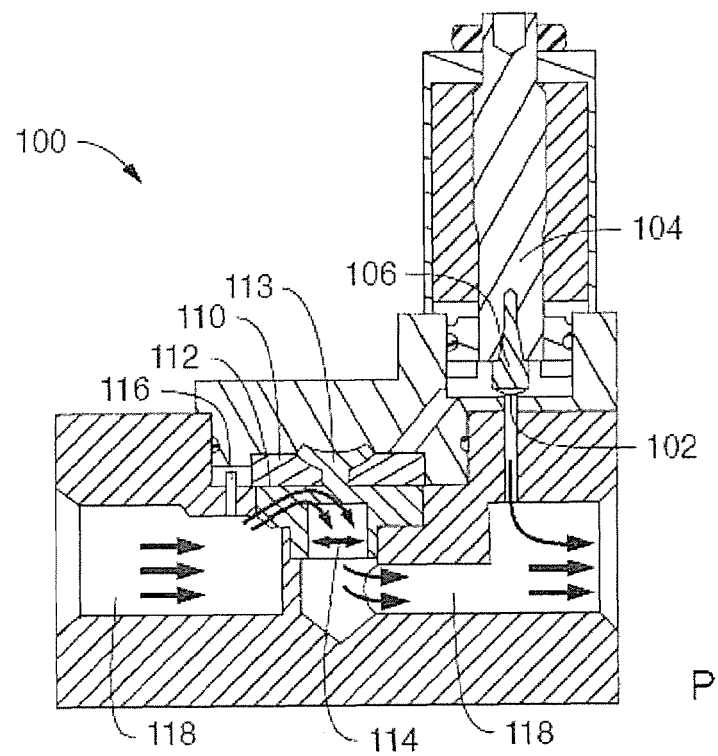

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF ILLUSTRATIVE EMBODIMENTS

Illustrative embodiments of the subject technology are now described. Other embodiments may be used or practiced in addition or instead. Details that may be apparent or unnecessary may be omitted to save space or for a more effective presentation. Conversely, some embodiments may be practiced without all of the details that are disclosed.

Figure 2:
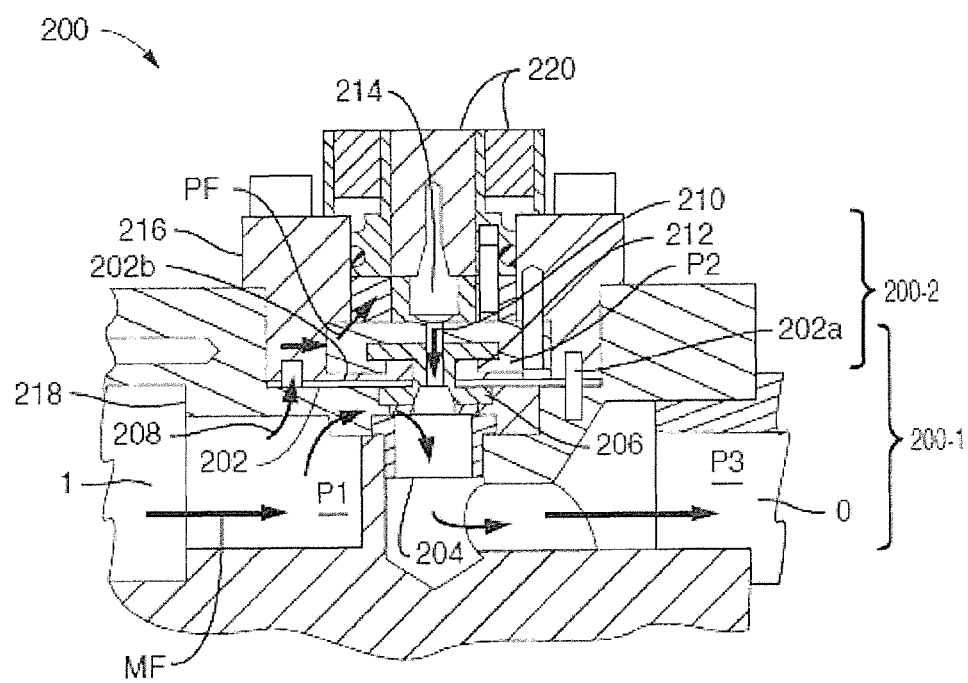
FIG. 2 depicts a cross-section view of a pilot valve structure in accordance with the present disclosure.

FIG. 2 depicts a cross-section view of a pilot valve assembly or structure 200 in accordance with the present disclosure. The structure 200 includes both a main or "piloted" valve (denoted by bracket 200-1) and a secondary or "pilot" valve (denoted by bracket 200-2), which is used to control the main valve 200-1. For the structure 200, a diaphragm 202 is present and is operative to open and close a main flow orifice 204 for the operation of the main valve 200-1; the diaphragm 202 may hold or include a plug 206 that (i) functions to seal the main flow orifice 204, and (ii) includes a flow channel/orifice that functions as part of the pilot valve 200-2. Pilot valve structure 200 may be used for applications where high flow rates are experienced to accommodate the high forces that may be inherent in such high-flow conditions.

Valve structure 200 provides for distinct pressure regions being created on either side of the flexible diaphragm 202. For the configuration shown, three different pressure regions can be considered: (i) an upstream region on bottom of diaphragm (denoted as "P1"); (ii) a region on the "top" side of diaphragm (denoted as "P2"); and, (iii) a region downstream of valves (denoted as "P3"). When the pilot valve 200-2 is closed P1=P2; when the pilot valve 200-2 is open P1>P2. In operation, P1 and P2 would normally be greater than P3. Operation of the pilot valve 200-2 controls the pressure difference on either side of the diaphragm 202. Due to this pressure differential the diaphragm 202 will bend, allowing the main "piloted" valve 200-1 to open and close proportionally with the pressure difference.

As shown in FIG. 2, the pilot valve structure 200 can include a main valve, 200-1, having a main flow body 218 defining a flow path (with the main valve flow path denoted by "MF") for a fluid and having an inlet (denoted by "I") and outlet (denoted by "O"), a diaphragm 202, with a perimeter 202a, a moveable portion 202b, and first and second sides. The perimeter 202a of the diaphragm 202 is fixed with respect to the valve body 218, and the moveable portion 202b is operative to move in response to a pressure differential existing between the first and second sides. A main flow orifice 204 is located in the flow body 218 between the inlet (I) and outlet (O). A main valve plug 206 is attached to and/or disposed in the moveable portion 202b of the diaphragm 202 and is operative to open and close the flow orifice 204 when the moveable portion 202b of the diaphragm is in first and second positions ("open" and "closed"), respectively.

Pilot valve 200-2 has a pilot valve flow body, e.g., shown by body 216, defining a flow path (with the pilot valve flow path denoted by "PF"). Pilot valve 200-2 also includes a pilot valve inlet 208 that is fluidically connected to the flow path of the main flow body 218 upstream of the main flow orifice 204. Pilot valve 200-2 further includes a pilot valve outlet including an orifice 210 disposed within (e.g., integral with) and co-located with the main valve plug 206. The pilot valve orifice 210 has a suitable cross-sectional area and is configured to permit fluid flow from the pilot inlet 208 to the main flow orifice 204. The pilot valve 200-2 includes a pilot valve plug 214, which is moveable along a range of positions (e.g., from a first to a second position) to open and close the pilot valve orifice 210. As shown, a pilot valve solenoid 220 (e.g., with an armature and coil) can be connected to the pilot valve plug 214 and operative to control the position of the pilot valve plug 214 along the range of positions in response to a received command signal, e.g., from a user input device and/or processor or other controller/control unit. This arrangement can lead to an effective reduced stroke (displacement or travel) of the main valve 200-1 for a given linear extent along the travel/displacement of the diaphragm 202, as that extent will also accommodate the travel of the pilot plug and/or associated solenoid; the reduced part count and corresponding savings in machinery may outweigh any such drawbacks from size/packaging configurations—and other size parameters, e.g., cross-sectional areas of main flow orifice 204, can be adjusted to compensate for a reduced stroke.

The cross-sectional area of the pilot valve inlet 208 and the pilot valve orifice (outlet) 210 can be designed or sized relative to one another (e.g., to achieve a desired ratio) to facilitate obtaining one or more desired performance characteristics of the structure 200. For example, in some embodiments the pilot valve inlet 208 can possess a cross-sectional area that is less than a cross-sectional area of the pilot valve orifice 210. This (ratio being less than or equal to 1) can facilitates pressure above the diaphragm 202 being less than pressure below the diaphragm 202. The ratio between the cross-sectional area of the pilot valve inlet 208 to the cross-sectional area of the pilot valve orifice 210 may also or in addition be selected such that the pilot valve has a desired response time for a given (e.g., anticipated) range of operational pressures (e.g., on the inlet side). For example, in some embodiments, the ratio between the cross-sectional area of the pilot valve inlet to the cross-sectional area of the pilot valve orifice may be selected such that the pilot valve creates differential pressure between the first and second sides of the diaphragm. Suitable examples of the ratio is/are in the range of 0.2 to 0.7, e.g., 0.5.

Additionally, the pilot valve outlet 210 may include an outlet channel having an end proximal to the pilot valve plug 214 and an end distal to the pilot valve plug 214, and the proximal end of the outlet channel has a cross-sectional area that is less than or equal to the cross-sectional area of the distal end of the outlet channel. Such a configuration may facilitate quick operation of the valve. Additionally, the response time of valve can be optimized by maximizing the cross-sectional area of the pilot valve orifice and/or minimizing volume on second side of diaphragm.

As was noted above, typically in prior pilot valve designs, the pilot valve plug and orifice are uniquely distinct structures from the piloted valve plug and orifice, independent of one another. This approach increases the part count and overall complexity of the design. For such prior pilot valve designed, the outlet of the pilot valve is typically downstream of the main valves outlet, which requires added machining within the flow body to create that flow path. Thus, pilot valve structures according to the present disclosure, because they utilize a pilot valve outlet, including an orifice, disposed within (e.g., integral with) and co-located with a main valve plug, can provide for benefits of simpler design (e.g., fewer number of parts) and/or less expensive construction (e.g., less extensive machining).

In operation of structure 200, when the pilot valve is closed the pressure on either side of the diaphragm 202 is equal and the main valve will be closed. As the pilot valve plug 214 lifts, fluid (e.g. gas) will flow through the pilot valve outlet channel 210, which is through the center of the combined plug-orifice 206. The pilot valve inlet 208 may be sized to be smaller than the pilot valve outlet and therefore facilitate causing the pressure above the diaphragm to become lower than below the diaphragm. This pressure differential then causes the combined plug-orifice to lift allowing gas to flow through the main valve.

For some applications, the pilot valve structure 200 may accommodate a pressure or pressure range on the inlet (or first) side of the diaphragm of within a range of 22-55 psia, e.g., for an outlet condition of vacuum/atmospheric pressure or 0 to 14.7 psia. The outlet pressure can be greater than vacuum/atmospheric pressure, and in exemplary embodiments, a target or operational specification may be up to 150 psig inlet pressure with an inlet to outlet pressure differential from 30-60 psid. In such embodiments, 150 psig inlet pressure with 90-120 psig outlet pressure could be an example of an operating condition. In other examples, generally, the range of operational differential pressures from inlet to outlet may be between, e.g., 20-60 psid. In further embodiments, the inlet range can be expanded to 20-165 psia. Such a pressure range(s) is/are exemplary, and other pressure(s) may of course be accommodated for other embodiments and/or applications.

Such pilot valve structures may be incorporated within or form a part or subsystem of other apparatus, including (but not limited to) mass flow verifiers or mass flow controllers, e.g., as described below with respect to FIG. 3.

Figure 3:
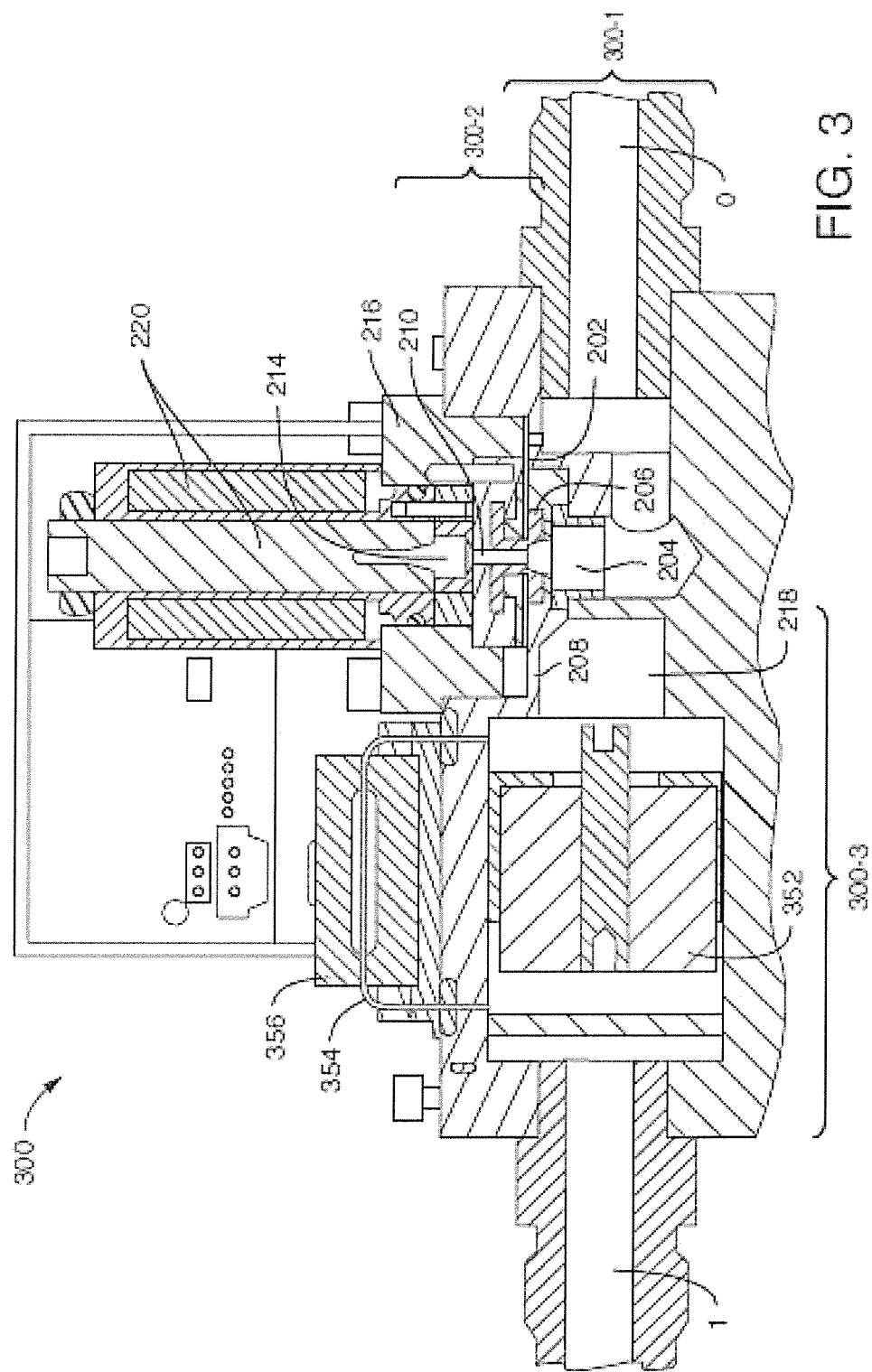
FIG. 3 depicts a cross-section view of an example of a mass flow controller including a pilot valve structure in accordance with the present disclosure.

FIG. 3 depicts a mass flow controller 300 incorporating a pilot valve structure in accordance with the present disclosure, and generally similar to the structure shown and described for FIG. 2 (with shared reference numbers where applicable). The structure 300 includes a main valve 300-1 and a pilot valve 300-2 and a mass-flow sensor 300-3. Mass flow sensor 300-3 may be of any suitable type, examples of which include but are not limited to, the following: thermal-based flow sensors, direct-thermal-immersion sensors, pressure-based-nozzle flow sensors, and other like flow-sensor technologies; of course, other suitable mass flow sensors may also be utilized within the scope of the present disclosure. As shown, an exemplary mass-flow sensor 300-3 may include a thermal-based mass flow sensor having a bypass 352 (e.g., channel or conduit with a laminar flow element), and a sensor tube 354 with thermal flow sensors (e.g., multiple resistive elements—not shown) within a housing 356. The inlet ("I") and outlet ("O") are indicated. A pilot valve solenoid 220 can receive commands, e.g., from a processor or controller/control unit, to open and close the main flow orifice 204 based on sensed mass flow signals from the mass flow sensor 300-3 (via the thermal flow sensors) and/or other signals. Accordingly, the processor or controller/control unit can control the flow through the main flow orifice 204 so that the flow through the valve (e.g., the conduit) as sensed or measured by the mass flow sensor 300-3 matches, or is brought into conformity with, or is made to usefully approach, a setpoint command signal (or, setpoint) received by the processor or controller/control unit.

Accordingly, simplified pilot valve structures according to the present disclosure may provide for various benefits, such as simpler and less expensive construction.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

In reading the present disclosure, one skilled in the art will appreciate that embodiments of the present disclosure can be implemented in hardware, software, firmware, or any combinations of such, and over one or more networks. Suitable software can include computer-readable or machine-readable instructions for performing methods and techniques (and portions thereof) of designing and/or controlling the implementation of data acquisition and/or data manipulation. Any suitable software language (machine-dependent or machine-independent) may be utilized. Moreover, embodiments of the present disclosure can be included in or carried by various signals, e.g., as transmitted over a wireless RF or IR communications link or downloaded from the Internet.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, benefit, advantage, or equivalent to the public, regardless of whether it is recited in the claims. The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. A pilot valve assembly comprising:
a main valve having (i) a main flow body defining a flow path for a fluid and having an inlet and outlet, (ii) a diaphragm, with a perimeter, a moveable portion, and first and second sides, wherein the perimeter of the diaphragm is fixed with respect to the main flow body, and wherein the moveable portion is operative to move in response to a pressure differential existing between the first and second sides, (iii) a main flow orifice in the main flow body between the inlet and outlet, and (iv) a main valve plug attached to the moveable portion of the diaphragm and operative to open and close the flow orifice when the moveable portion of the diaphragm is in first and second positions, respectively;
a pilot valve having (i) a pilot valve flow body defining a flow path and having a pilot valve inlet connected to the flow path of the main flow body upstream of the main flow orifice, (ii) a pilot valve outlet including an orifice disposed within the main valve plug, wherein the pilot valve orifice has a cross-sectional area and is configured to permit fluid flow from the pilot inlet to the main flow orifice, and (iii) a pilot valve plug moveable along a range of positions from a first position to a second position and operative to open and close the pilot valve flow orifice when the pilot valve plug is in first and second positions, respectively;
wherein the pilot valve orifice is co-located with and integral to the main valve plug; and
a pilot valve solenoid connected to the pilot valve plug and operative to control the position of the pilot valve plug along the range of positions in response to a received command signal.

2. The pilot valve structure of claim 1, wherein the pilot valve inlet has a cross-sectional area less than the cross-sectional area of the pilot valve orifice.

3. The pilot valve structure of claim 1, wherein the pilot valve outlet comprises an outlet channel having an end proximal to the pilot valve plug and an end distal to the pilot valve plug, and wherein the proximal end of the outlet channel has a cross-sectional area that is less than or equal to a cross-sectional area of the distal end of the outlet channel.

4. The pilot valve assembly of claim 3, wherein the outlet channel has a conical profile.

5. The pilot valve assembly of claim 2, wherein a ratio between the cross-sectional area of the pilot valve inlet to the cross-sectional area of the pilot valve orifice is selected such that the pilot valve creates differential pressure between the first and second sides of the diaphragm.

6. The pilot valve assembly of claim 5, wherein a ratio is in a range of 0.2 to 0.7.

7. The pilot valve assembly of claim 5, wherein a range of operational pressures on the inlet side is between 22 psia and 55 psia.

8. A mass flow controller with pilot valve, comprising:
(A) a mass flow sensor operative to sense flow through a conduit and to provide a signal indicative of the sensed flow;
(B) a control valve connected to the conduit, and having a main valve having (i) a main flow body defining a flow path for a fluid and having an inlet and outlet, (ii) a diaphragm, with a perimeter, a moveable portion, and first and second sides, wherein the perimeter of the diaphragm is fixed with respect to the main flow body, and wherein the moveable portion is operative to move in response to a pressure differential existing between the first and second sides, (iii) a main flow orifice in the main flow body between the inlet and outlet, and (iv) a main valve plug attached to the moveable portion of the diaphragm and operative to open and close the flow orifice when the moveable portion of the diaphragm is in first and second positions, respectively;
(C) a pilot valve having (i) a pilot valve flow body defining a flow path and having a pilot valve inlet connected to the flow path of the main flow body upstream of the main flow orifice, (ii) a pilot valve outlet including an orifice disposed within the main valve plug, wherein the pilot valve orifice has a cross-sectional area and is configured to permit fluid flow from the pilot inlet to the main flow orifice, (iii) a pilot valve plug moveable along a range of positions from a first position to a second position and operative to open and close the pilot valve flow orifice when the pilot valve plug is in first and second positions, respectively; and (iv) a pilot valve solenoid connected to the pilot valve plug and operative to control the position of the pilot valve plug along the range of positions in response to a received command signal; wherein the pilot valve orifice is co-located with and integral to the main valve plug; and
(D) a controller operative to receive a setpoint command signal, receive a signal indicative of mass flow from the mass flow sensor, and control a mass flow output of the mass flow controller by controlling the pilot valve solenoid to move the pilot valve plug.

9. The mass flow controller of claim 8, wherein the pilot valve inlet has a cross-sectional area less than the cross-sectional area of the pilot valve orifice.

10. The mass flow controller of claim 8, wherein the pilot valve outlet comprises an outlet channel having an end proximal to the pilot valve plug and an end distal to the pilot valve plug, and wherein the proximal end of the outlet channel has a cross-sectional area that is less than or equal to a cross-sectional area of the distal end of the outlet channel.

11. The mass flow controller of claim 10, wherein the outlet channel has a conical profile.

12. The mass flow controller of claim 9, wherein a ratio between the cross-sectional area of the pilot valve inlet to the cross-sectional area of the pilot valve orifice is selected such that the pilot valve creates differential pressure between the first and second sides of the diaphragm.

13. The mass flow controller of claim 12, wherein a ratio is in the range of 0.2 to 0.7.

14. The mass flow controller of claim 12, wherein a range of operational pressures on the inlet side is between 22 psia and 55 psia.

* * * * *